United States Patent
Ahn

(10) Patent No.: US 10,923,701 B2
(45) Date of Patent: Feb. 16, 2021

(54) SENSING BLOCK AND BATTERY PACKAGE INCLUDING SAME

(71) Applicant: Tyco Electronics AMP Korea Co. Ltd, Gyeongsangbuk-do (KR)

(72) Inventor: Kwang Wook Ahn, Gyungsangbuk-do (KR)

(73) Assignee: Tyco Electronics AMP Korea Co. Ltd., Gyeongsangbuk-do (KR)

( * ) Notice: Subject to any disclaimer, the term of this patent is extended or adjusted under 35 U.S.C. 154(b) by 24 days.

(21) Appl. No.: 15/142,649

(22) Filed: Apr. 29, 2016

(65) Prior Publication Data
US 2016/0248070 A1 Aug. 25, 2016

Related U.S. Application Data

(63) Continuation of application No. PCT/KR2014/010331, filed on Oct. 31, 2014.

(30) Foreign Application Priority Data

Oct. 31, 2013 (KR) ........................ 10-2013-0131085
Jan. 27, 2014 (KR) ........................ 10-2014-0009652
May 13, 2014 (KR) ........................ 10-2014-0057370

(51) Int. Cl.
*H01M 2/02* (2006.01)
*H01M 2/20* (2006.01)
*H01M 2/10* (2006.01)
*H01M 10/48* (2006.01)
*H01M 10/42* (2006.01)

(52) U.S. Cl.
CPC ......... *H01M 2/202* (2013.01); *H01M 2/1061* (2013.01); *H01M 2/1077* (2013.01); *H01M 10/482* (2013.01); *H01M 10/4257* (2013.01)

(58) Field of Classification Search
CPC .. H01M 2/202; H01M 10/482; H01M 2/1061; H01M 2/1077; H01M 10/4257
See application file for complete search history.

(56) References Cited

U.S. PATENT DOCUMENTS

| 8,846,240 B2 | 9/2014 | Merriman et al. |
| 2010/0151299 A1 | 6/2010 | Ha et al. |
| 2011/0059342 A1 | 3/2011 | Lee et al. |
| 2011/0070474 A1 | 3/2011 | Lee et al. |

(Continued)

FOREIGN PATENT DOCUMENTS

| EP | 2538466 A2 | 12/2012 |
| EP | 2650946 A1 | 4/2013 |

(Continued)

OTHER PUBLICATIONS

European search report, dated Jul. 4, 2017, 10 pages.
International Search Report, Application No. PCT/KR2014/010331, dated Feb. 11, 2015, 2 pages.

*Primary Examiner* — Cynthia K Walls
(74) *Attorney, Agent, or Firm* — Barley Snyder

(57) ABSTRACT

A sensing block having a block body and a first connecting member of conductive material. The block body includes a terminal seat section and a cell lead coupling section provided on one or both sides of the terminal seat section. The first connecting member is positioned to correspond to the terminal seat section.

26 Claims, 13 Drawing Sheets

(56) References Cited

U.S. PATENT DOCUMENTS

| | | | |
|---|---|---|---|
| 2012/0241422 A1* | 9/2012 | Cai | B23K 15/0006 |
| | | | 219/121.14 |
| 2013/0216878 A1* | 8/2013 | Merriman | H01M 2/206 |
| | | | 429/92 |
| 2014/0087221 A1 | 3/2014 | Kim et al. | |
| 2014/0220420 A1 | 8/2014 | Yoshioka et al. | |

FOREIGN PATENT DOCUMENTS

| KR | 10-2010-0109857 A | 10/2010 |
|---|---|---|
| KR | 101230954 B1 | 2/2013 |
| WO | 2007102670 A1 | 9/2007 |
| WO | 2007102671 A1 | 9/2007 |

* cited by examiner

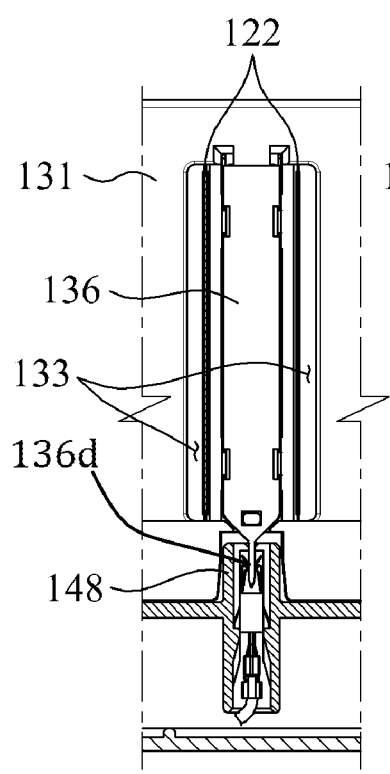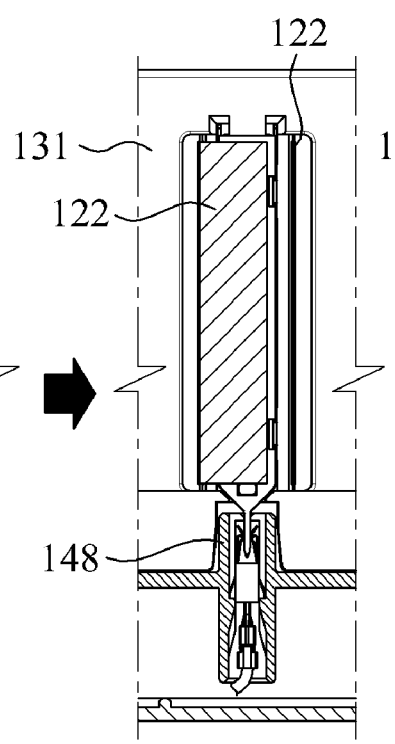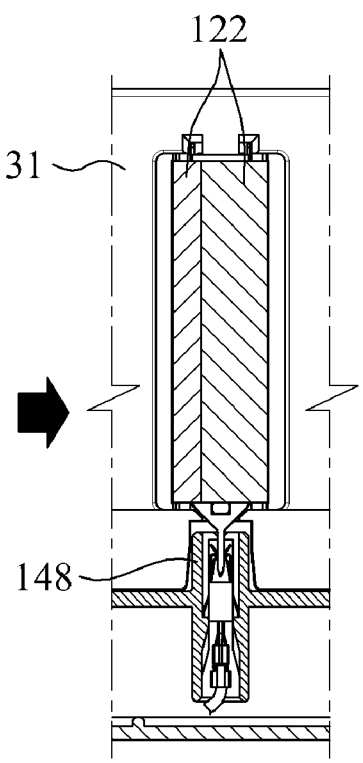

200

SENSING BLOCK AND BATTERY PACKAGE INCLUDING SAME

CROSS-REFERENCE TO RELATED APPLICATIONS

This application is a continuation of PCT International Application No. PCT/KR2014/010331 filed Oct. 31, 2014, which claims priority under 35 U.S.C. § 119 to Korean Patent No. 10-2013-0131085 filed Oct. 31, 2013, Korean Patent No. 10-2014-0009652 dated Jan. 27, 2014 and Korean Patent No. 10-2014-0057370 filed May 13, 2014.

FIELD OF THE INVENTION

The invention relates to a battery package and, more particularly, to a battery package having a sensing block.

BACKGROUND

Batteries are divided into primary batteries that are used once and discarded, and secondary batteries that can be recharged and used multiple times.

The secondary batteries are applied to various industries due to such an advantage, and widely used as energy sources for electronic devices. Further, secondary batteries are emerging as energy sources for hybrid electrical vehicles to solve air pollution issues caused by existing gasoline and diesel internal combustion engines using fossil fuels.

In general, a nickel metal hydrate (Ni-MH) battery is used as a secondary battery. Recently, use of a lithium-ion battery is being attempted. To satisfy high output and large capacity, a large-capacity secondary battery pack is used as the secondary battery by connecting small unit cells, hereinafter referred to as "battery cells", in series or in parallel. In the secondary battery pack, the battery cells may be stacked with high density, and prismatic or pouch cells are used to increase a utilization of a space.

Korean Registered Patent No. 10-1230954 discloses a known battery module having a battery cell stack, voltage sensing members, an upper case, and a lower case. The battery cell stack includes a plurality of battery cells or unit modules connected in series or in parallel to each other, or a plurality of battery cells or unit modules connected in series and in parallel to each other in a state in which the battery cells or the unit modules are stacked along a lateral direction thereof. The battery cell stack is provided at the front thereof with bus bars to connect electrode terminals of the battery cells to external input and output terminals. The voltage sensing members are provided at ends thereof with connection terminals electrically connected to electrode terminal connection parts of the battery cells disposed at the front and rear of the battery cell stack to sense voltages of the battery cells or the unit modules. The upper case covers the end of one side of the battery cell stack and sections of the top and bottom of the battery cell stack, and provided with mounting parts, in which the voltage sensing members are inserted and mounted. The lower case is coupled to the upper case in a state in which the lower case covers the end of the other side of the battery cell stack and sections of the top and bottom of the battery cell stack, with the lower case being positioned along the front thereof with the external input and output terminals.

The known battery module has difficulties in externally recognizing whether the electrode terminals of the battery cells are appropriately electrically connected to the voltage sensing members. In addition, the connection between the electrode terminals of the battery cells and the external input and output terminals is not solid.

SUMMARY

An aspect of the invention provides a sensing block and a battery package including the same that may be conveniently assembled and definitively guarantee an electrical connection state.

According to an aspect of the invention, a sensing block having a block body and a first connecting member of conductive material is provided. The block body includes a terminal seat section and a cell lead coupling section provided on one or both sides of the terminal seat section. The first connecting member is positioned to correspond to the terminal seat section.

The sensing block may further include a cell stack fastening section provided on one side of the block body, and configured to fix the block body to a battery cell stack.

BRIEF DESCRIPTION OF THE DRAWINGS

FIG. 5A is a schematic diagram showing a first process of connecting a cell lead to a second connecting member of the battery package according to the invention;

FIG. 5B is a schematic diagram showing a second process of connecting the cell lead to the second connecting member of the battery package according to the invention;

FIG. 5C is a schematic diagram showing a third process of connecting the cell lead to the second connecting member of the battery package according to the invention;

FIG. 5B is a schematic diagram of the battery package according to the invention, showing a sensing block connected to a lower housing thereof;

DETAILED DESCRIPTION OF THE EMBODIMENT(S)

Figure 1:
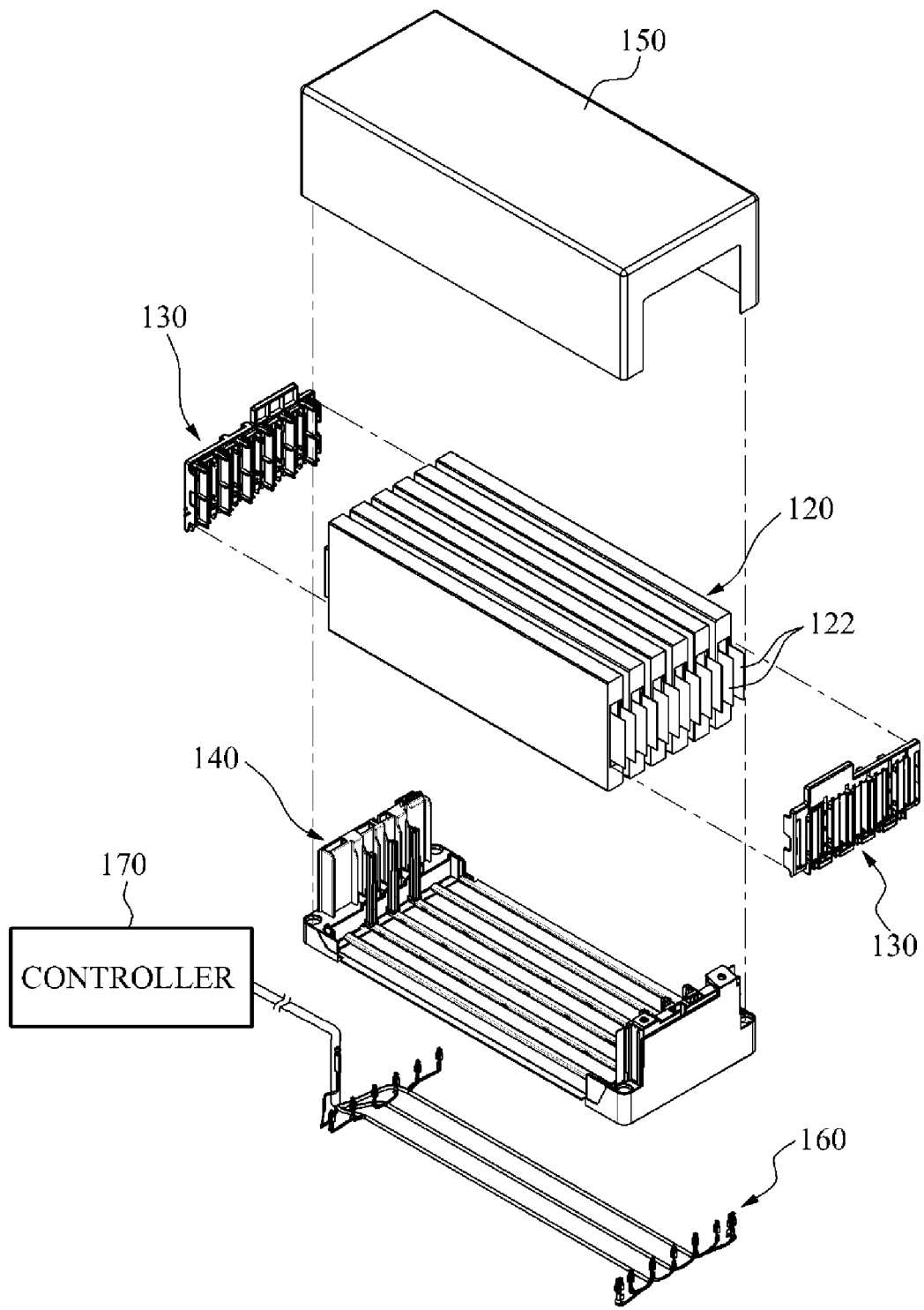
FIG. 1 is an exploded perspective view of a battery package according to the invention.

Hereinafter, certain embodiments of the invention will be explained in more detail with reference to the attached drawings. The same component or components corresponding to each other will be provided with the same reference numeral, and their detailed explanation will be omitted. When it is determined that a detailed description is related to a related known function or configuration which may make the purpose of the present disclosure unnecessarily ambiguous in the description, such a detailed description will be omitted.

In addition, terms such as first, second, A, B, (a), (b), and the like may be used herein to describe components of the invention. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 2:
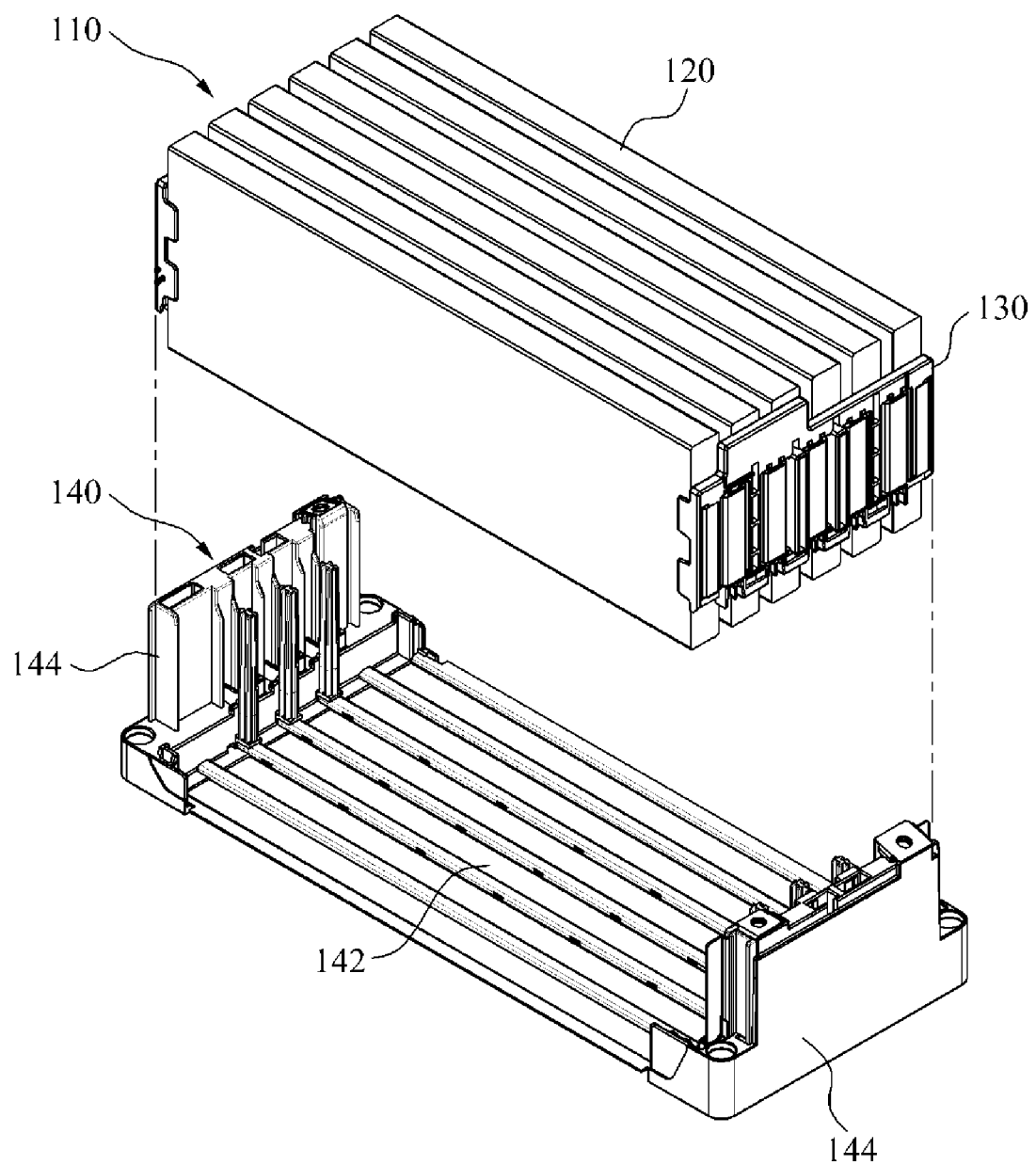
FIG. 2 is another exploded perspective view of the battery package according to the invention, showing connection of a battery assembly to a lower housing.

Referring to FIGS. 1 and 2, a battery package 100 according to an exemplary embodiment of the invention may include a battery assembly 110 having a battery cell stack 120 and a sensing block 130, a lower housing 140, an upper housing 150, and a sensing wire 160. The sensing wire 160 may be connected to a controller 170 configured to control the battery package 100.

The battery assembly 110 may include the battery cell stack 120, and the sensing block 130 is attached to one or both sides of the battery cell stack 120.

The battery cell stack 120 may be formed by stacking a plurality of battery cells. The battery cells may be in a form of plates. The battery cells may be positioned in a structure identical to, for example, that of the plate battery cells disclosed in FIG. 1 of Korean Registered Patent No. 10-123094. Thus, detailed descriptions of the battery cells will be omitted for sake of brevity.

The battery cell stack 120 may include the plurality of battery cells, a cell lead 122, and a power bus bar (not shown).

The cell lead 122 may be positioned on one or both sides of the battery cells, and configured to transmit voltages of the battery cells.

The lower housing 140 may be positioned on a lower side of the battery assembly 110, and configured to enclose at least a section of a lower end and/or a side surface of the battery assembly 110. The lower housing 140 may include a center section 142, and a side surface 144.

The center section 142 may be a section configured to enclose the lower end of the battery assembly 110. On a top surface of the center section 142, multiple ribs may be positioned to partition and support the individual battery cells. The center section 142 may include a material having excellent heat conductivity to function as a heat sink configured to emit heat generated by the battery cell stack 120. In this example, the center section 142 may also be referred to as a "heat sink". The heat sink may include a metallic material, for example, copper or aluminum with excellent heat conductivity.

The side surface 144 may enclose a section of side surfaces of the battery assembly 110, and be structurally and electrically coupled to the sensing block 130. The side surface 144 may be coupled to one or both sides of the center section 122. The side surface 144 may prevent an external force to be applied to the sensing block 130. The side surface 144 may include a material differing from that of the center section 142. For example, the side surface 144 may include synthetic resin, such as plastic.

The upper housing 150 may be positioned on an upper side of the battery assembly 110, and configured to enclose at least a section of an upper end and/or side surfaces of the battery assembly 110.

The sensing wire 160 may transmit information related to the battery cell stack 120 to the controller 170. For example, the sensing wire 160 may transmit, to the controller 170, information on voltages of the battery cell stack 120 or the individual battery cells (including a current to be used to measure states of the battery cells). One side of the sensing wire 160 may be connected to a second connecting member 148 of FIG. 3 provided on the lower housing 140, and another side of the sensing wire 160 may be connected to the controller 170.

The controller 170 may sense the states of the battery cells based on the information received from the sensing wire 160.

As shown in FIG. 2, the battery assembly 110 may be configured by coupling the sensing block 130 to one or both sides of the battery cell stack 120. In this example, the cell lead 122 may be structurally and electrically connected to a first connecting member 136 (FIG. 4) of the sensing block 130. The battery assembly 110 may be coupled to the lower housing 140. In this example, the first connecting member 136 may be structurally and electrically connected to the second connecting member 148 of FIG. 3. Through the foregoing assembly process, the cell lead 122 may be electrically connected to the sensing wire 160 through the second connecting member 148.

Figure 3:
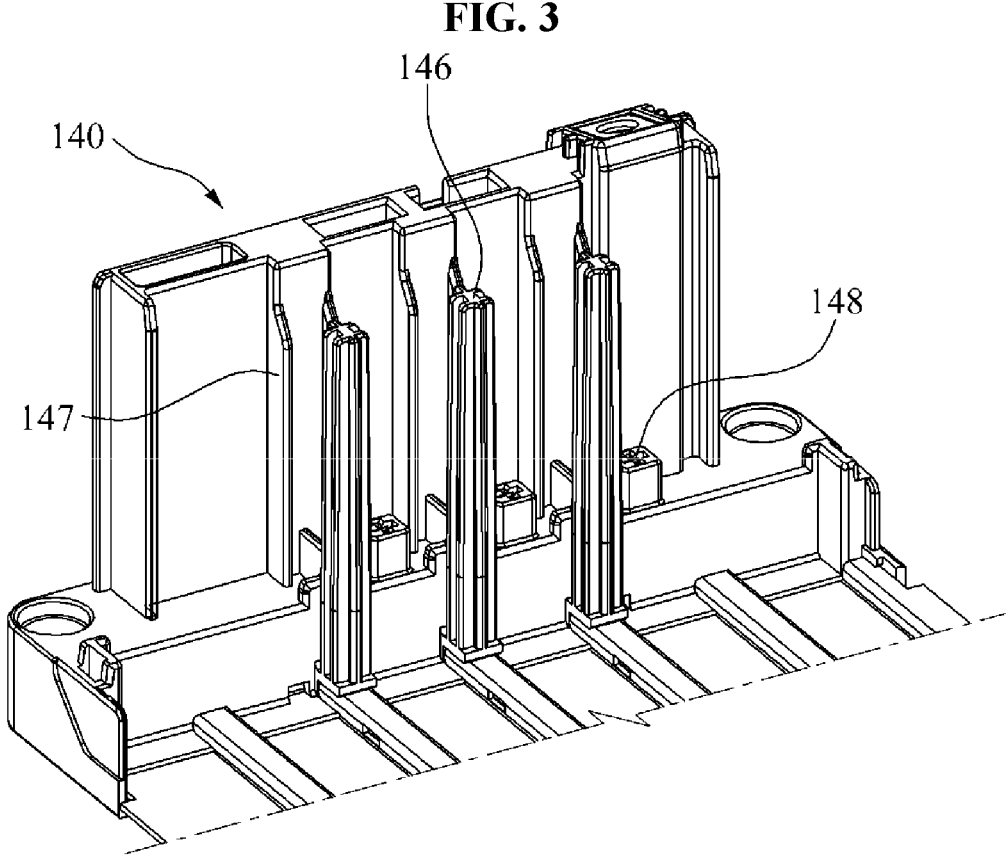
FIG. 3 is a partial perspective view of a lower housing of the batter package according to the invention.

Referring to FIG. 3, the lower housing 140 according to the exemplary embodiment of the invention may include a guide rail 146, a guide rib 147, and the second connecting member 148.

The guide rail 146 may guide the battery assembly 110 during connection with the lower housing 140. The guide rail 146 may be a rail extending from a lower side of the lower housing 140 in an upper direction. The guide rail 146 may be positioned on one side of the center section 142 or the side surface 144. The guide rail 146 may guide the battery assembly 110 to be coupled or separated in a vertical direction, based on the example of FIG. 1. A plurality of guide rails 146 may be positioned.

The guide rib 147 may guide the battery cell stack 120 during connection with the lower housing 140. In detail, the guide rib 147 may guide a slide rib 137 of FIG. 4 to be coupled in a sliding manner. The guide rib 147 may protrude on an inner wall of the side surface 144. An upper end of the guide rib 147 may be inclined downward in a direction toward an internal section, and configured to enable the battery cell stack 120 to be smoothly coupled to the lower housing 140.

The second connecting member 148 may be a section to which the first connecting member 136 is to be structurally and electrically coupled. The second connecting member 148 may be positioned on one side of the center section 142 or the side surface 144. For example, the second connecting member 148 may be positioned on an inner side of the side surface 144. A plurality of second connecting members 148 corresponding to a number of the first connecting members 136 may be positioned.

The second connecting member 148 may be provided in a shape corresponding to that of the first connecting member 136. For example, one of the first connecting member 136 and the second connecting member 148 may be positioned in a protruding shape, and the other may be positioned in a recessed shape so that the first connecting member 136 and the second connecting member 148 may be coupled to each other. By the foregoing shapes, in the assembly process of the battery assembly 110 and the lower housing 140, the first connecting member 136 may be structurally and electrically connected to the second connecting member 148.

Figure 4:
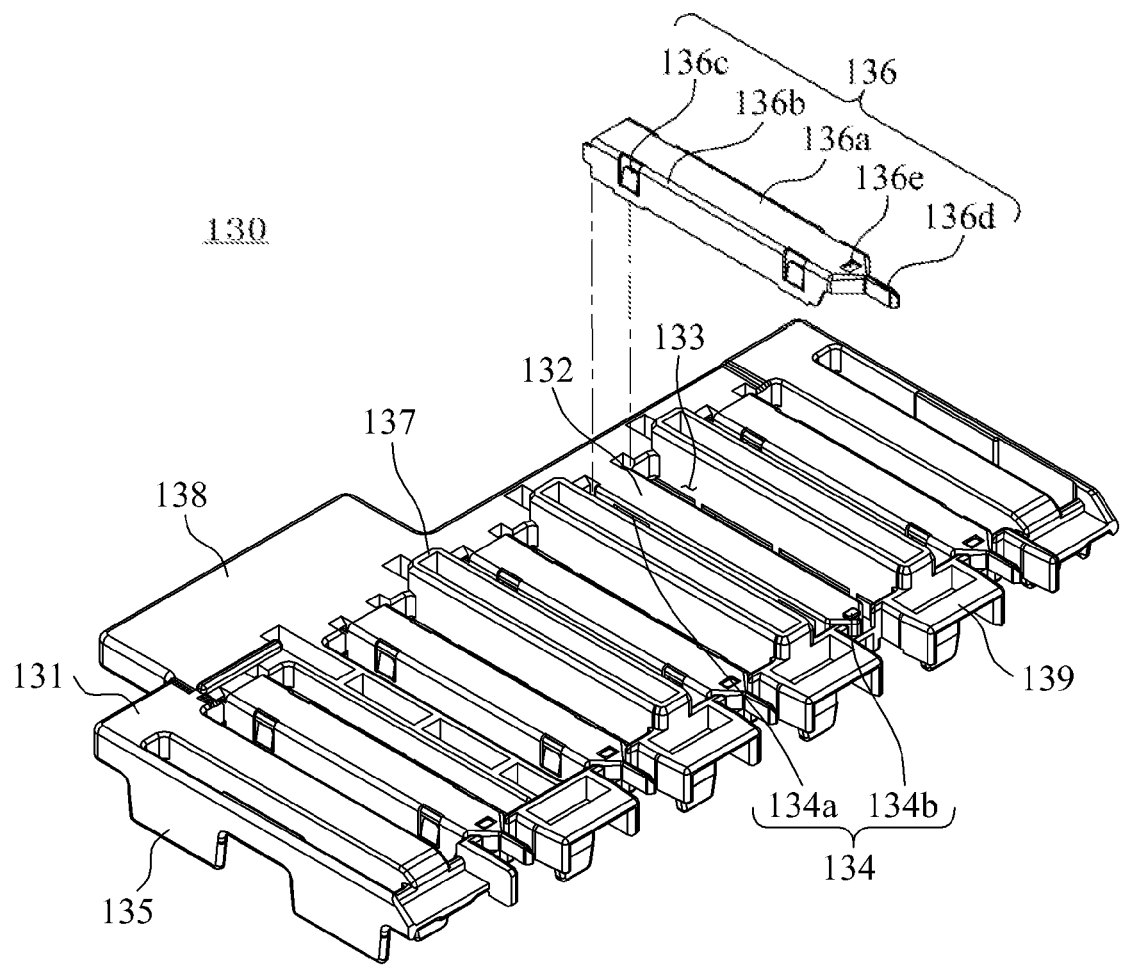
FIG. 4 is an exploded perspective view of a sensing block of the battery package according to the invention.

In the interim, a cover insertion section provided in a shape corresponding to a cover section 139 of FIG. 4 may be configured to be recessed on one or both sides of the second connecting member 148. The cover insertion section may be coupled to the cover section 139. The cover insertion section may be positioned in a tapered shape to enable the cover section 139 to be smoothly inserted into the cover insertion section.

Referring to FIG. 4, the sensing block 130 according to the exemplary embodiment of the invention may include a block body 131, a cell stack fastening section 135, the first connecting member 136, a power bus bar supporting section 138, and the cover section 139.

The block body 131 may form an exterior of the sensing block 130. The block body 131 may include a terminal seat section 132, a cell lead coupling section 133, a lock 134, and the slide rib 137.

The terminal seat section 132 may be a section on which the first connecting member 136 is to be seated.

The cell lead coupling section 133 may be positioned on one or both sides of the terminal seat section 132. The cell lead 122 may be inserted into the cell lead coupling section 133, and structurally and electrically connected to the first connecting member 136.

The cell lead coupling section 133 may be, for example, a hole provided on one or both sides of the terminal seat section 132. In this example, the cell lead 122 may be inserted through the cell lead coupling section 133, and exposed on an external surface of the sensing block 130. However, an example embodiment is not limited thereto. The cell lead coupling section 133 may not be essentially provided as a hole.

The lock 134 may fix the first connecting member 136 to the terminal seat section 132.

A plurality of locks 134 may be positioned to support the first connecting member 136 in different directions. For example, the lock 134 may include a first lock 134a provided on a side surface of the terminal seat section 132, and a second lock 134b provided on a top surface of the terminal seat section 132.

The first lock 134a may be, for example, a recess that is recessed from the side surface of the terminal seat section 132.

The second lock 134b may be, for example, a protrusion that protrudes from the top surface of the terminal seat section 132.

The first lock 134a and the second lock 134b may prevent the first connecting member 136 from being moved in a backward direction by an insertion repulsive force when the first connecting member 136 is coupled to the second connecting member 148. Thus, by the first lock 134a and the second lock 134b, the first connecting member 136 may be solidly coupled to the second connecting member 148.

Unlike the drawings, the first lock 134a may be a protrusion, and the second lock 134b may be a recess. Detailed descriptions will be omitted for sake of brevity.

The cell stack fastening section 135 may be positioned on one side of the block body 131, and enable the block body 131 to be fixed to the battery cell stack 120. For example, the cell stack fastening section 135 may be bent from both ends of the block body 131. As shown in FIG. 1, a recess of a shape corresponding to the cell stack fastening section 135 may be positioned on both sides of the battery cell stack 120.

The slide rib 137 may protrude from one surface of the block body 131. The slide rib 137 may be positioned and shaped to correspond to the guide rib 147 provided on the lower housing 140. The slide rib 137 may be inserted into a space between two adjacent guide ribs 147. For example, six guide ribs 147 may be positioned on the lower housing 140 as shown in FIG. 3, and three slide ribs 137 corresponding to the six guide ribs 147 may be positioned on the sensing block 130 as shown in FIG. 4. However, a number of the guide ribs 147 and a number of the slide ribs 137 are not limited thereto. By way of the slide rib 137 and the guide rib 147, the sensing block 130 may be coupled to the lower housing 140 at an accurate position. The first connecting member 136 may include a terminal body section 136a, a bend section 136b, hanging sections 136c and 136e, and a connecting section 136d.

The terminal body section 136a may form an exterior of the first connecting member 136.

The bend section 136b may be bent from both sides of the terminal body section 136a to enclose both sides of the terminal seat section 132.

The hanging sections 136c and 136e may be positioned in shapes corresponding to the first lock 134a and the second lock 134b, respectively, and enable the first connecting member 136 to be fixed to the terminal seat section 132.

A plurality of hanging sections 136c and 136e may be positioned. For example, the hanging sections 136c and 136e may include a first hanging section 136c to be fastened to the first lock 134a, and a second hanging section 136e to be fastened to the second lock 134b.

The first hanging section 136c may be positioned on the terminal body section 136a or the bend section 136b. For example, the first hanging section 136c may be formed by cutting out a section at which the terminal body section 136a is adjacent to the bend section 136b.

The second hanging section 136e may be positioned on the terminal body section 136a. For example, the second hanging section 136e may be a hole provided in the terminal body section 136. The second lock 134b may be inserted into the second hanging section 136e.

The connecting section 136d is a section used during connection with the second connecting member 148. The connecting section 136d may be configured to protrude, for example, in a wedged shape. At least a section of the connecting section 136 may narrow toward an outer side. In detail, a width of an end section of the connecting section 136 may be configured to be narrower than a width of a remaining section thereof. Thus, the connecting section 136d may be easily fastened to the second connecting member 148.

Conversely, the connecting section 136d and the second connecting member 148 may be positioned in reversed shapes. For example, the second connecting member 148 may be configured to protrude in a wedged shape, and the connecting section 136d may be detachably provided in a shape corresponding to the second connecting member 148.

The power bus bar supporting section 138 may enable the power bus bar to be spaced apart from the cell lead 122. In detail, the power bus bar supporting section 138 may prevent a direct contact between the power bus bar and the cell lead 122. The power bus bar supporting section 138 may be a non-conductive material to be connected to the block body 131. The power bus bar supporting section 138 and the block body 131 may be positioned as an integral body, or provided as separate members.

The cover section 139 may be configured to enclose at least a section of the connecting section 136d. The cover section 139 may be configured to extend from the block body 131 in a direction in which the connecting section 136d is exposed. The cover section 139 may be positioned on one or both sides of the connecting section 136d. The cover section 139 may be configured to extend toward a further outer side than the connecting section 136d. The cover section 139 may prevent the connecting section 136d from being bent by an unexpected external force in a working process.

The cover section 139 may be coupled to the cover insertion section provided on one or both sides of the second connecting member 148. An end section of the cover section 139 may be positioned in a tapered shape. By way of the foregoing shape, the cover section 139 may be smoothly inserted into the cover insertion section.

Referring to FIG. 5, in a process of coupling the sensing block 130 to the battery cell stack 120, the cell lead 122 may penetrate through the cell lead coupling section 133 and be exposed to an external section of the sensing block 130. Two cell leads 122 may be disposed on both sides of a single first connecting member 136.

An exposed section of one of the two cell leads 122 may be bent to be in contact with the first connecting member 136. Similarly, an exposed section of the other cell lead 122 may be bent to be in contact with the first connecting member 136. Using the foregoing method, the cell lead 122 may be electrically connected to the first connecting member 136.

To solidify an electrical connection in the foregoing state, the cell lead 122 and the first connecting member 136 may be welded, or fastened using a bolt. As a welding method, laser welding, ultrasonic welding, and the like may be used.

Using the foregoing method, whether the cell lead 122 is appropriately connected to the first connecting member 136 may be verified with naked eyes from the external section of the battery assembly 110.

Figure 6:
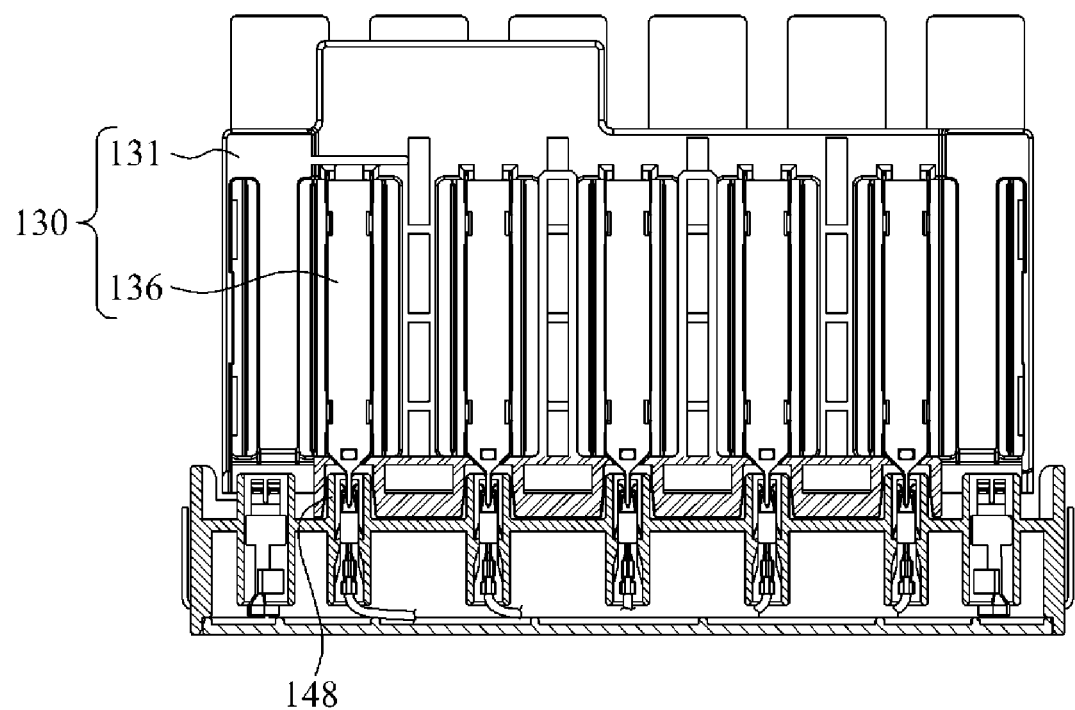
FIG. 6 is a cross-sectional view
Figure 7:
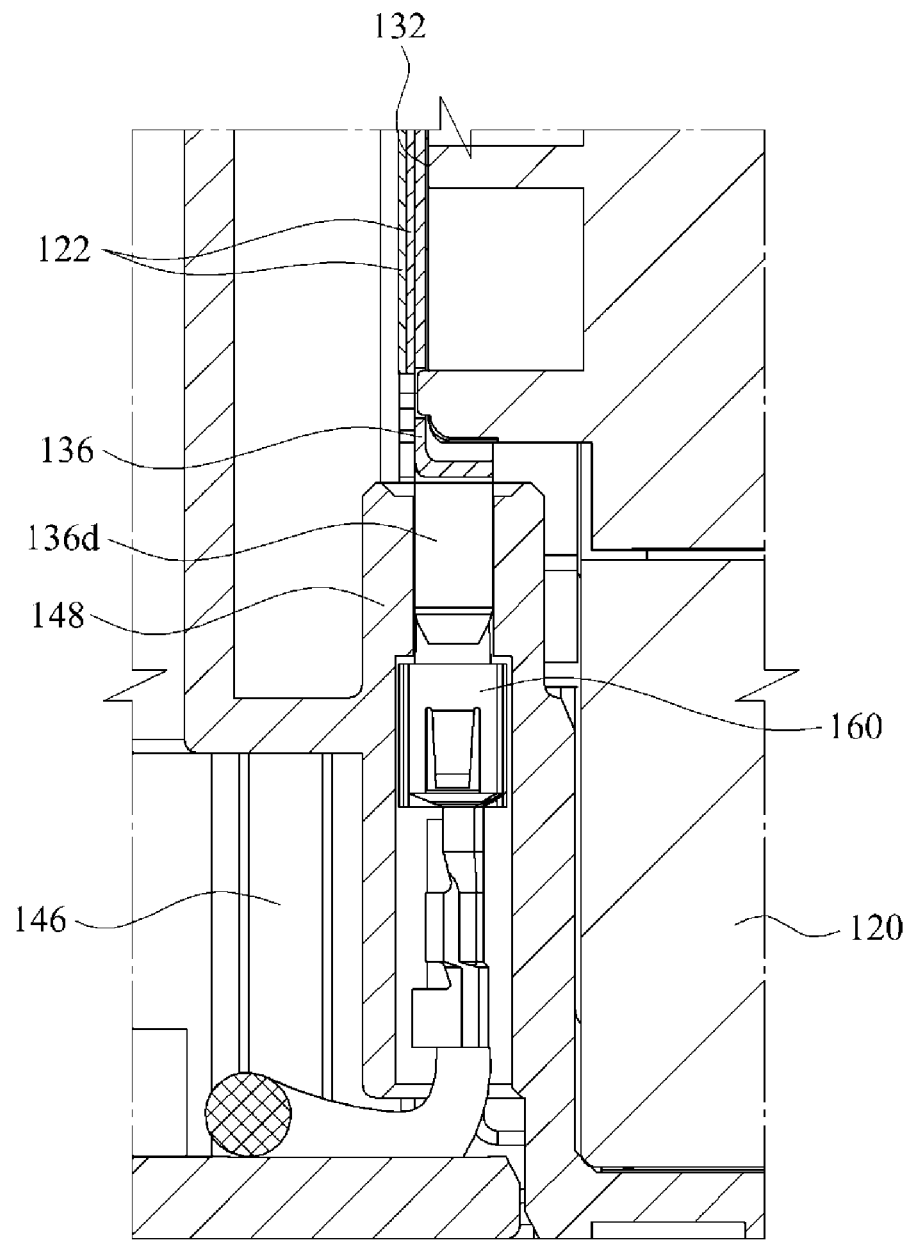
FIG. 7 is a cross-sectional view of the battery package according to the invention where the sensing block is connected to the lower housing according.
Figure 8:
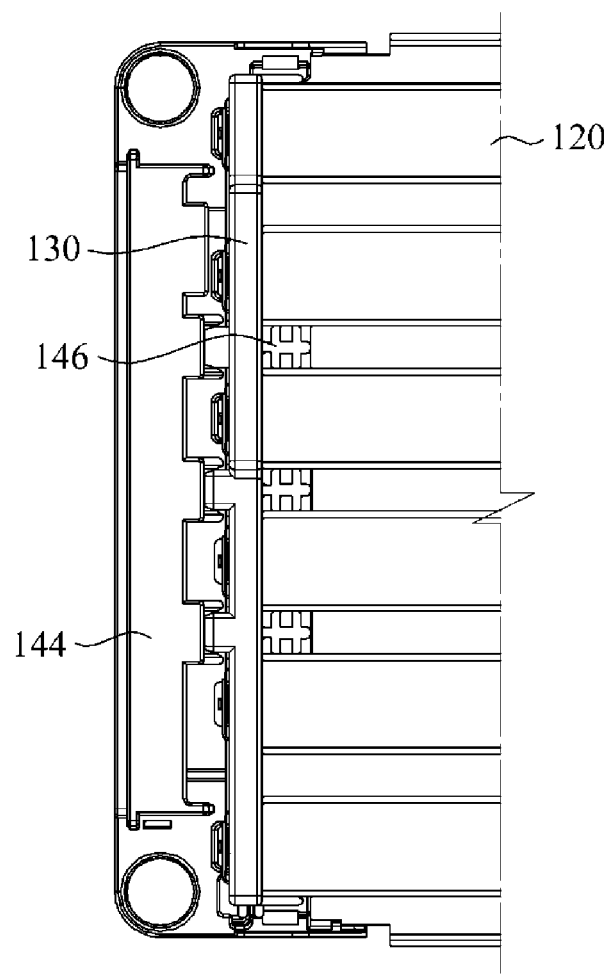
FIG. 8 is a partial top view of the battery package according to the invention showing an upper housing separated therefrom.

When the battery assembly 110 is coupled to the lower housing 140 as shown in FIGS. 6 through 8, the connecting section 136d of the first connecting member 136 may be connected to the second connecting member 148.

The guide rail 146 may be inserted into an interval between the battery cell stack 120 and the sensing block 130, and configured to prevent the battery assembly 110 from moving in left, right, front, and back directions. The guide rail 146 may be inserted into a space between multiple individual battery cells constituting the battery cell stack 120.

Figure 9:
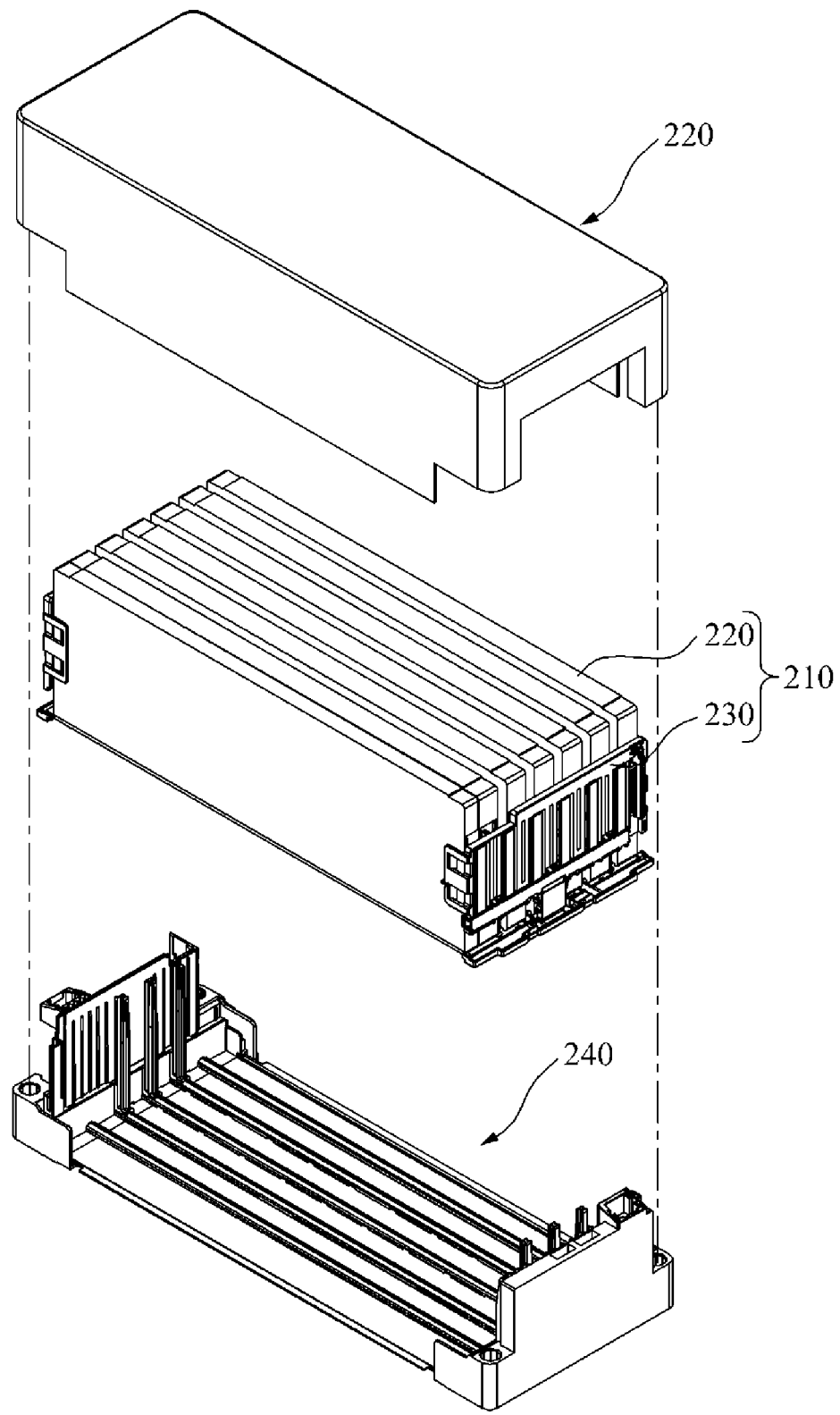
FIG. 9 is an exploded perspective view of another battery package according to the invention.
Figure 10:
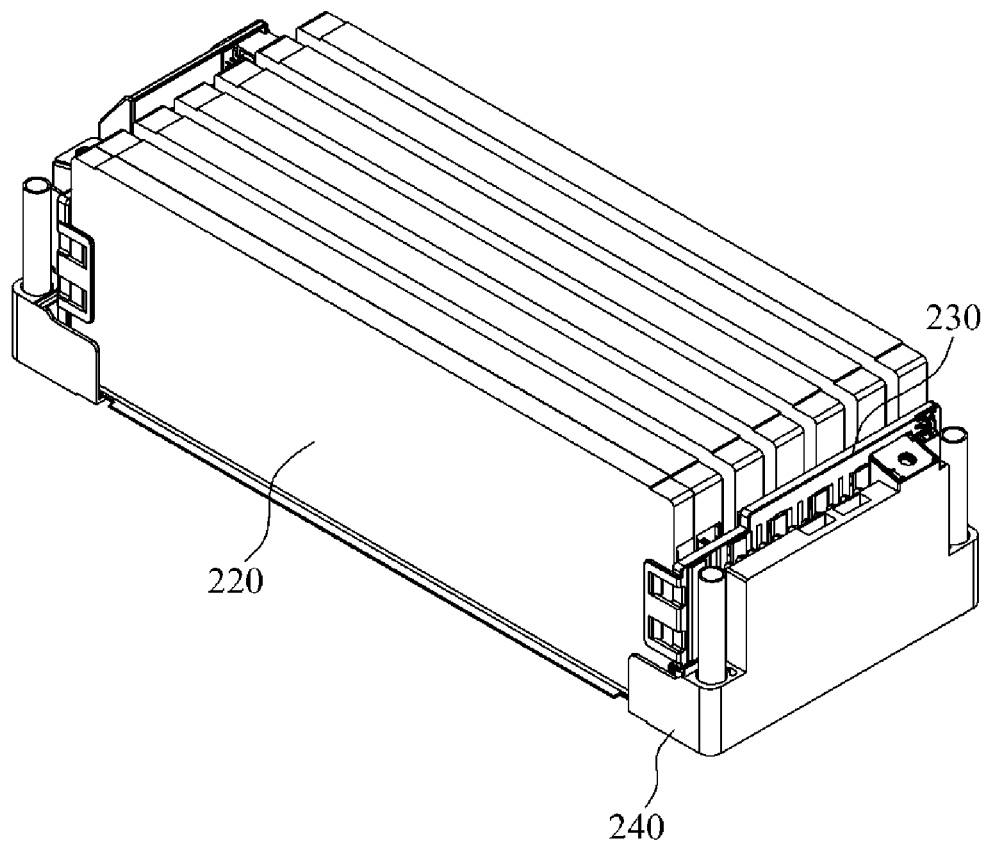
FIG. 10 is a perspective view of the battery package according to the invention, showing a battery cell stack, a sensing block, and a lower housing connected together.

Referring to FIGS. 9 and 10, a battery package 200 according to the another exemplary embodiment of the invention may include a battery assembly 210 including a battery cell stack 220 and a sensing block 230, a lower housing 240, and an upper housing 250. The cell lead 122 may be positioned on the battery cell stack 220.

Figure 11:
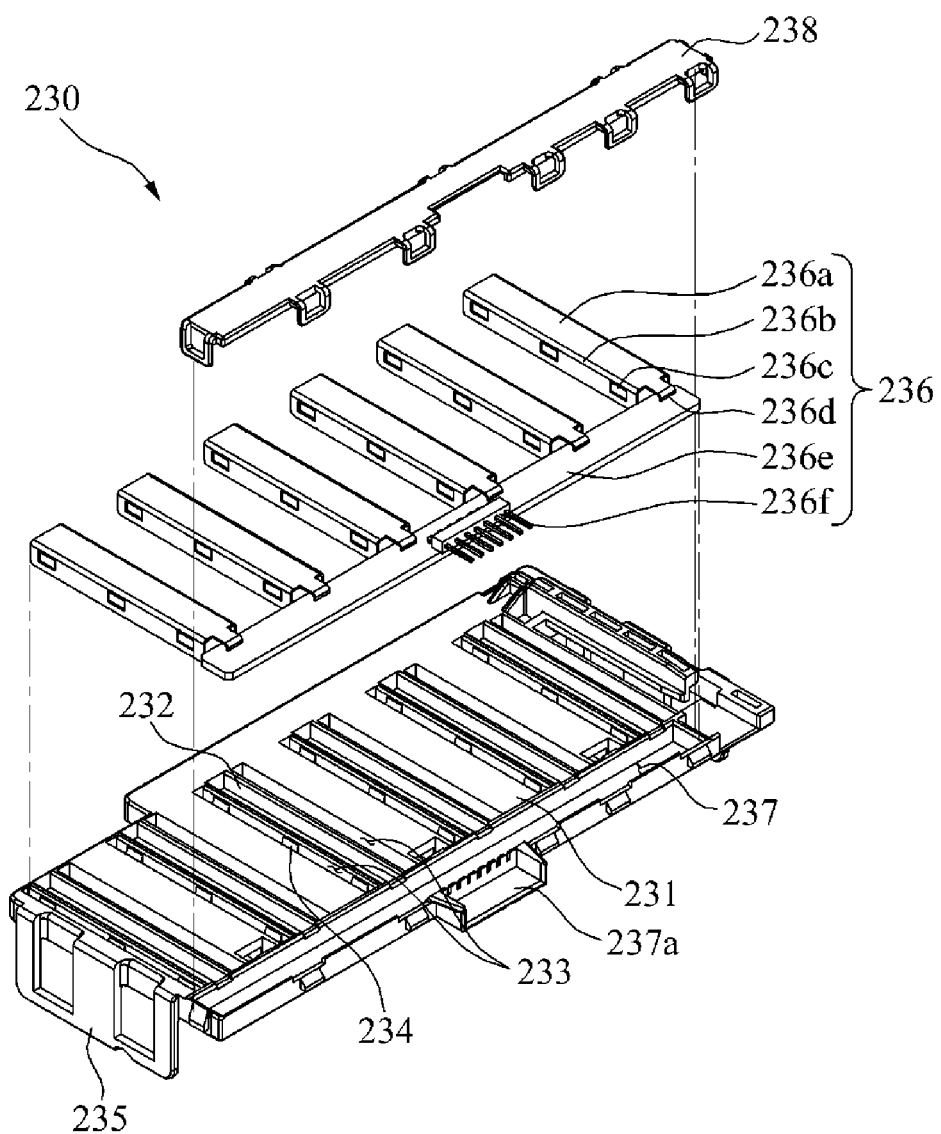
FIG. 11 is an exploded perspective view a sensing block of the battery package according to the invention.

Similar to the exemplary embodiment of the invention, described above, the cell lead 122 may be connected to a first connecting member 236 of the sensing block 230 of FIG. 11.

Referring to FIG. 11, the sensing block 230 according to another exemplary embodiment of the invention may include a block body 231, a cell stack fastening section 235, and the first connecting member 236.

The block body 231 may include a terminal seat section 232, a cell lead coupling section 233, a lock 134, and a circuit substrate seat section 237.

The terminal seat section 232 is a section on which the first connecting member 236 is to be seated.

The cell lead coupling section 233 may be positioned on one or both sides of the terminal seat section 232. The cell lead 122 may be inserted into the cell lead coupling section 233, and electrically and structurally connected to the first connecting member 236.

The cell lead coupling section 233 may be, for example, a hole provided on one or both sides of the terminal seat section 232. In this example, the cell lead 122 may be inserted through the cell lead coupling section 233, and exposed on an external surface of the sensing block 230.

The lock 234 may enable the first connecting member 236 to be fixed to the terminal seat section 232. The lock 234 may be positioned on one side of the terminal seat section 232. The lock 234 may be positioned, for example, in a form of a hook.

The circuit substrate seat section 237 may be a space in which a circuit substrate 236e is to be seated. The circuit substrate seat section 237 may be configured to be recessed on one side of the block body 231. The circuit substrate seat section 237 may be configured to be elongated in a direction intersecting a longitudinal direction of the terminal seat section 232. For example, the circuit substrate seat section 237 may be positioned in a direction orthogonal to the terminal seat section 232. By the circuit substrate seat section 237, the circuit substrate 236e may be solidly fixed.

A cover section 237a may be configured to extend on one side of the circuit substrate seat section 237. The cover section 237a may protect a header pin 236f.

For example, the cover section 237a may be positioned on an opposite side of the terminal seat section 232 with respect to the circuit substrate seat section 237. The cover section 237a may be positioned at a center section of the circuit substrate seat section 237. The cover section 237a may be positioned in a shape of approximately a flattened-U shape.

The cover section 237a may prevent the header pin 236f from being bent or damaged by an external force. Further, by the shape of the cover section 237a, the cover section 237a may be engaged with a cover insertion section 249 (FIG. 12) to guide the header pin 236f to be inserted in a correct direction.

The cell stack fastening section 235 may be positioned on one side of the block body 231, and enable the block body 231 to be fixed to the battery cell stack 220. For example, the cell stack fastening section 235 may be bent from both ends of the block body 231. The cell stack fastening section 234 may be positioned, for example, a shape of a hook.

The first connecting member 236 may include a terminal body section 236a, a bend section 236b, a hanging section 236c, a connecting section 236d, the circuit substrate 236e, and the header pin 236f.

The terminal body section 236a may form an exterior of the first connecting member 236. The cell lead 122 may be connected to the terminal body section 236a.

The bend section 236b may be bent from both sides of the terminal body section 236a to enclose both sides of the terminal seat section 232.

The hanging section 236c may be shaped and positioned to correspond to the lock 234, and enable the first connecting member 236 to be fixed to the terminal seat section 232. The hanging section 236c may be positioned on the terminal body section 236a or the bend section 236b. For example, the hanging section 236c may be formed by cutting out a section at which the terminal body section 236a is adjacent to the bend section 236b.

The connecting section 236d may be connected to the circuit substrate 236e. When a plurality of connecting sections 236d are provided, the plurality of connecting sections

236d may be electrically connected to a single circuit substrate 236e. Through the connecting section 236d, the cell lead 122 may be electrically connected to the circuit substrate 236e.

Figure 12:
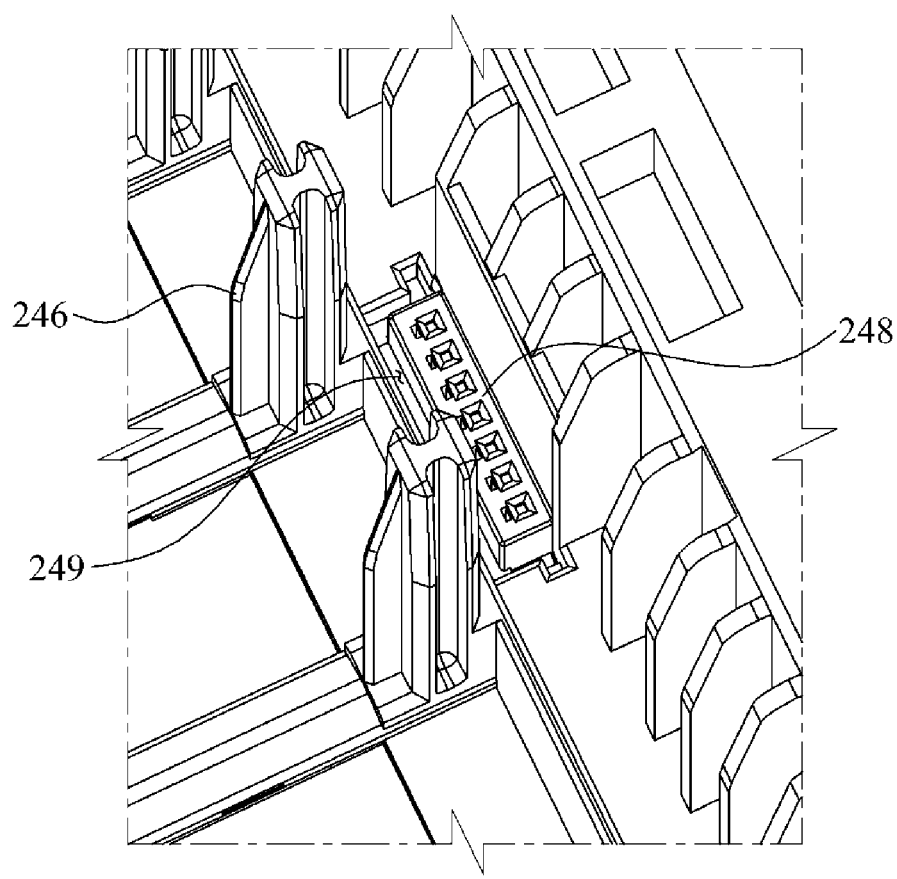
FIG. 12 is a partial perspective view of a lower housing of the battery package according to the invention.

The circuit substrate 236e may be electrically connected to the connecting section 236d, and transmit information received from the cell lead 122 to a second connecting member 248 of FIG. 12. The circuit substrate 236e may be seated on the circuit substrate seat section 237.

The header pin 236f may be positioned on one side of the circuit substrate 236e, and coupled to the second connecting member 248. The header pin 236f may be positioned on an inner side of the cover section 237a. In detail, the cover section 237a may be configured to enclose at least a section of the header pin 236f.

For example, the header pin 236f may be positioned on an opposite side of the terminal body section 236a with respect to the circuit substrate 236e. The header pin 236f may be positioned at a center section of the circuit substrate 236e.

Referring to FIG. 12, the lower housing 240 according to another exemplary embodiment of the invention may include a guide rail 246, and the second connecting member 248.

The guide rail 246 may guide the battery assembly 210 during connection with the lower housing 240. The guide rail 246 may be a rail extending from a lower side of the lower housing 240 in an upper direction. The guide rail 246 may be positioned on one side of the center section 242 or the side surface 244. The guide rail 246 may guide the battery assembly 210 to be coupled or separated in a vertical direction, based on the example of FIG. 8.

The second connecting member 248 may be a section to which the first connecting member 236 is to be structurally and electrically coupled. The second connecting member 248 may be positioned at a position corresponding to the first connecting member 236. The second connecting member 248 may be positioned to be detachable from the header pin 236f.

The cover insertion section 249 into which the cover section 237a is to be inserted may be positioned on a periphery of the second connecting member 248. The cover insertion section 249 may be a recess that is recessed from one surface of the lower housing 240, or a hole provided by cutting out a section of the lower housing 240.

The cover insertion section 249 may be positioned and shaped to correspond to the cover section 237a. For example, the cover insertion section 249 may be positioned in a shape of a flattened-U shape.

In an assembly process of the battery assembly 210 and the lower housing 240, the first connecting member 236 may be structurally and electrically connected to the second connecting member 248.

Figure 13:
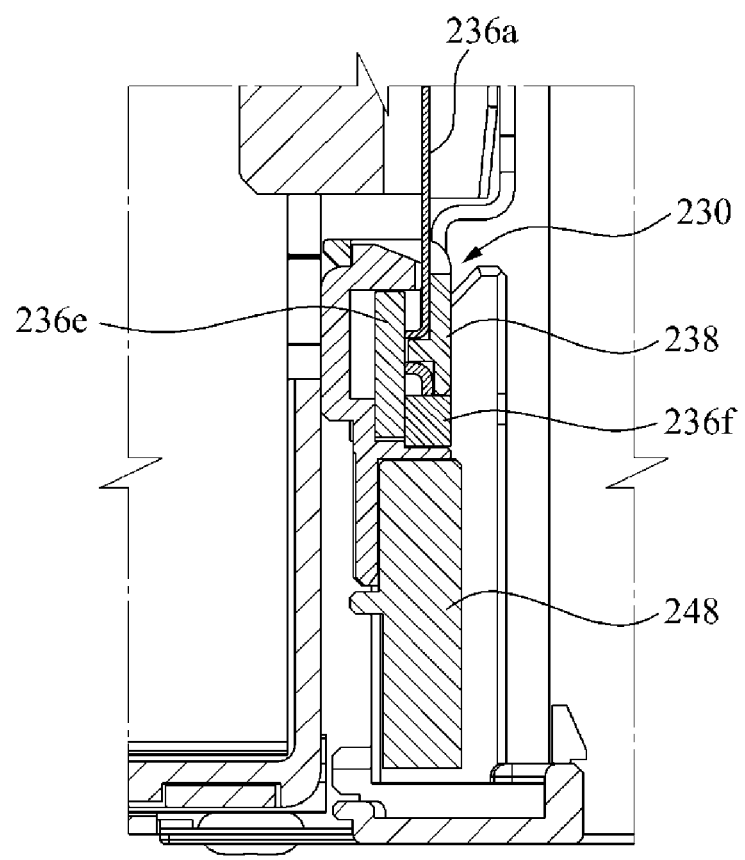
FIG. 13 is a cross-sectional view of the battery package according to the invention where the sensing block is connected to the lower housing thereof.

When the battery assembly 210 is coupled to the lower housing 240 as shown in FIG. 13, the header pin 236f of the first connecting member 236 may be connected to the second connecting member 248. In detail, by assembling the battery assembly 210 and the lower housing 240, the first connecting member 236 may be structurally and electrically connected to the second connecting member 248.

According to example embodiments of the invention, a battery package may be simply assembled. In detail, by seating a battery cell stack to which a sensing block is attached on a lower housing, battery cells may be structurally seated in the housing and an electrical connection for voltage sensing is completed. Further, by inserting a battery cell lead into the sensing block fixed to a side surface of the battery cell stack and connecting the cell lead to a bus bar of the sensing block on an external surface, a producer or a user may readily verify an electrical connection state. In detail, the electrical connection state in a battery package may be definitely guaranteed.

Although a few embodiments of the invention have been shown and described, the invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A sensing block comprising:
a block body having a terminal seat section, a first lock positioned on one side of the terminal seat section, and a cell lead coupling section formed for a cell lead to be inserted and disposed on one or both sides of the terminal seat section; and
a first connecting member of conductive material positioned to correspond to the terminal seat section, wherein the first connecting member includes a terminal body section and a bend section fitting over, and enclosing the terminal seat section along both sides and along the top of the terminal seat section, and the cell lead is welded to the first connecting member.

2. The sensing block of claim 1, further comprising a cell stack fastening section positioned on one side of the block body.

3. The sensing block of claim 2, wherein the cell stack fastening section secures the block body to a battery cell stack.

4. The sensing block of claim 1, wherein the first connecting member further includes a connecting section positioned along an end section of the terminal body section.

5. The sensing block of claim 4, wherein the connection section further includes a width that narrows toward an outer side thereof.

6. The sensing block of claim 1, wherein the sensing block further includes a circuit substrate connected to the first connecting member.

7. The sensing block of claim 6, wherein the sensing block further includes a header pin receiving a signal flowing through the circuit substrate.

8. The sensing block of claim 7, wherein the header pin passes the signal to an external device.

9. The sensing block of claim 8, wherein the block body further includes a circuit substrate seat section on which the circuit substrate sits and a cover section covering the header pin.

10. The sensing block of claim 1, wherein the first lock is a hook.

11. The sensing block of claim 10, wherein the first connecting member further includes a first hanging section positioned to correspond to the first lock to secure the block body.

12. The sensing block of claim 1, wherein the block body further includes a second lock protruding from a top surface of the terminal seat section.

13. The sensing block of claim 12, wherein the first connecting member further includes a second hanging section positioned to correspond to the second lock.

14. The sensing block of claim 13, wherein the second hanging section is a second lock receiving passageway.

15. The sensing block of claim 14, wherein the cell lead coupling section is disposed on one or both sides of the terminal seat section and receives the cell lead therethrough.

16. The sensing block of claim 15, wherein the terminal body section is seated on the terminal seat section and the bend section is bent from both sides of the terminal body section and inserted into the cell lead coupling section.

17. A sensing block comprising:
a block body having a terminal seat section, a cell lead coupling section disposed on one or both sides of the terminal seat section, and a first lock positioned on one side of the terminal seat section; and
a first connecting member of conductive material positioned to correspond to the terminal seat section.

18. The sensing block of claim 17, wherein the first lock is a hook.

19. The sensing block of claim 18, wherein the first connecting member further includes a first hanging section positioned to correspond to the first lock to secure the block body.

20. The sensing block of claim 19, wherein the block body further includes a second lock protruding from a top surface of the terminal seat section.

21. The sensing block of claim 20, wherein the first connecting member further includes a second hanging section positioned to correspond to the second lock.

22. The sensing block of claim 21, wherein the second hanging section is a second lock receiving passageway.

23. The sensing block of claim 22, wherein the cell lead coupling section is disposed on one or both sides of the terminal seat section and receives a cell lead therethrough.

24. The sensing block of claim 23, wherein the first connecting member further includes a terminal body section seated on the terminal seat section and a bend section.

25. A sensing block comprising:
a block body having a terminal seat section and a cell lead coupling section disposed on one or both sides of the terminal seat section; and
a first connecting member of conductive material positioned to correspond to the terminal seat section, having a terminal body section and a connecting section positioned along an end section of the terminal body section and having a width that narrows toward an outer side thereof.

26. A sensing block comprising:
a block body having a terminal seat section and a cell lead coupling section formed for a cell lead to be inserted and disposed on one or both sides of the terminal seat section; and
a first connecting member of conductive material positioned to correspond to the terminal seat section, wherein the first connecting member includes a connecting section positioned along an end section of a terminal body section, and having a width that narrows toward an outer side thereof, and the first connecting member further including a bend section fitting over, and enclosing the terminal seat section along both sides and along the top of the terminal seat section, and the cell lead is welded to the first connecting member.

* * * * *